UNITED STATES PATENT OFFICE.

EDWARD H. R. BARTON, OF ENGLEWOOD, NEW JERSEY.

PHOTOGRAPHIC SHUTTER.

1,141,681.

Specification of Letters Patent.

Patented June 1, 1915.

Application filed May 2, 1911. Serial No. 624,644.

*To all whom it may concern:*

Be it known that I, EDWARD H. R. BARTON, a citizen of the United States, residing at Englewood, in the county of Bergen and State of New Jersey, have invented a new and useful Photographic Shutter, of which the following is a specification.

My invention relates to a new form of photographic shutter in which an exposure is made by the motion and rearrangement of parts in the opening through which light passes to the sensitive plate, in contradistinction to the wellknown forms in which the parts pass across the opening or withdraw from, and reënter it. It does not make any essential difference whether the parts slide or are pivoted, or how they move, so long as they progress so that during the exposure, all parts of the opening become uncovered. The advantages of this form of shutter are that all portions of any opening, however large, may be exposed practically simultaneously with a very slight motion of the moving parts, thus eliminating distortion from photographs of rapidly moving objects, and making this form of shutter in effect many times faster than any other form of shutter while giving the same actual exposure. I attain these objects by the mechanism illustrated in the accompanying drawings, in which—

Figure 1:
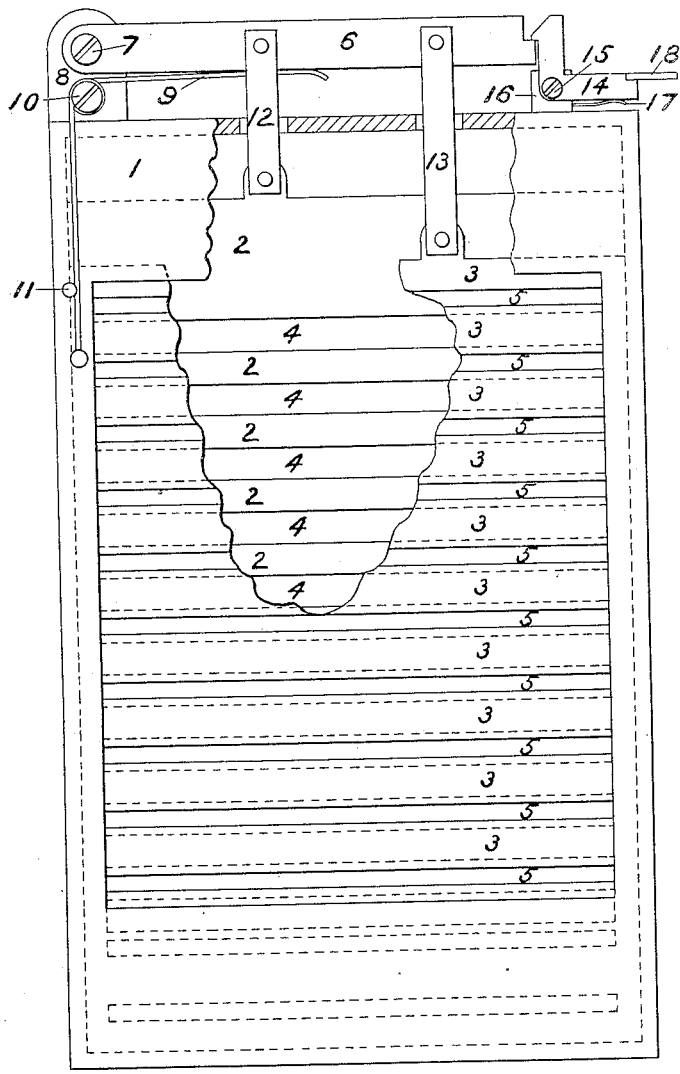
Figure 2:
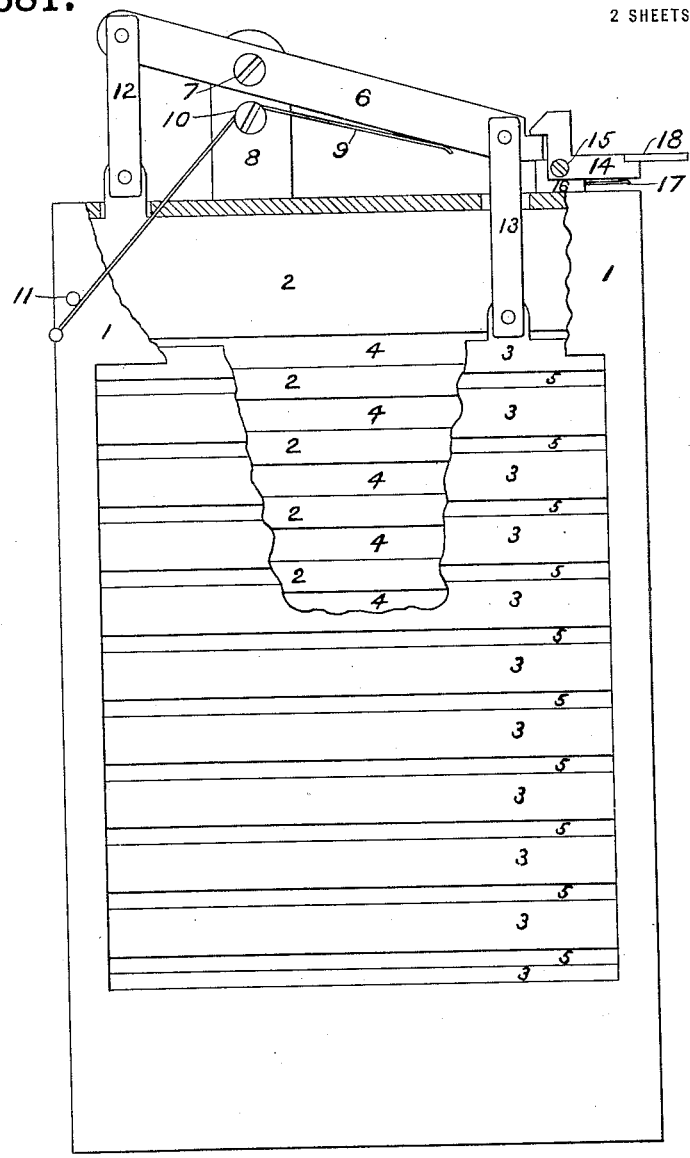

Figure 1 is an elevation partly in section and partly broken away, showing one form of my shutter, and Fig. 2 is a similar view showing a modification.

In both drawings 1 is the body or case of the shutter.

2 and 3 are moving slides or shutters.

4—4 are slots or openings in slide 2.

5—5 are slots or openings in slide 3.

6 is a lever which moves the slides 2 and 3.

7 is a stud pivoting lever 6 to the lug 8 on body 1.

9 is a spring to force lever 6 up.

10 is a stud pivoting spring 9 to lug 8.

11 is a stud to restrain the lower end of spring 9.

12 and 13 are links which connect slides 2 and 3 respectively, to lever 6.

14 is a latch to hold lever 6 down.

15 is a stud pivoting latch 14 to the lug 16 on body 1.

17 is a spring fastened to lug 16 and pressing against latch 14.

18 is a key or trigger to release the shutter for an exposure.

The shutter is shown closed and set, ready for an exposure. The slides 2 and 3 are at their lower positions and the openings of each are covered by the solid portions of the other. The spring 9 is compressed and tends to force the lever 6 upward. The said lever is prevented from moving, by the latch 14 which is held in position by the spring 17 and which engages the outer end of the lever 6. To make an exposure, the trigger 18 is depressed, thus causing the latch 14 to disengage the lever 6. When the said lever, thus released, moves up under the impulse of the spring 9, it moves the slides 2 and 3 by means of the connecting links 12 and 13 respectively. Moreover, the slide 3 will move faster than the slide 2 because its point of connection to lever 6 is farther from the pivot 7, and the openings 5—5 of slide 3 will be drawn over, register with and pass the openings 4—4 in slide 2. When the slides have completed their travel and come to rest against the case, the openings of each will be again closed by solid portions of the other.

In order that the exposure shall be complete and uniform, it is necessary that the relative speeds of the slides shall be made to bear proper relations to the sizes of the openings and the widths of the solid portions of each. These relations can be worked out in an infinite number of combinations, and for slides moving in opposite directions as well as in the same direction, as shown in Fig. 1 and Fig. 2. The proportions shown seem to be the most practical and are as follows:—Slide 3 moves twice as fast as slide 2 and openings 5—5 in slide 3 are one-half the width of openings 4—4 in slide 2. The solid portions 2—2 and the openings 4—4 of slide 2 are of equal width. The solid portions 3—3 of slide 3 are three times the width of the openings 5—5.

As an indefinite variation in the style, number and proportions of parts may be made and the same objects attained in substantially the same manner, I do not desire to be limited to the particular mechanism shown; but

What I claim as my invention, and desire to secure by Letters Patent, is—

1. In a photographic shutter, a frame surrounding an opening, sets of slats adapted to completely close said opening, and means to move said sets of slats within said opening, the slats of each set all moving at the same speed but the speeds of the sets being different, so as to open or expose all parts of said opening and to completely close it again, substantially as, and for the purposes set forth.

2. In a photographic shutter, a frame surrounding an opening, two sets of slats adapted to completely close said opening, and means to move said sets of slats within said opening, the slats of each set all moving at the same speed but the speeds of the two sets being different, so as to open or expose all parts of said opening and to completely close it again, substantially as, and for the purposes set forth.

3. In a photographic shutter, a frame surrounding an opening, two sets of slats adapted to completely close said opening, and means to move said sets of slats within said opening without withdrawing them from it, the slats of each set all moving at the same speed but the speeds of the two sets being different, so as to open or expose all parts of said opening and to completely close it again, substantially as, and for the purposes set forth.

4. In a photographic shutter, a frame surrounding an opening, two sets of slats adapted to completely close said opening, and means to move said sets of slats within said opening without withdrawing them from it, the slats of each set all moving at the same speed but the speeds of the two sets being different, so as to open or expose all parts of said opening at a plurality of points at the same time and to completely close it again, substantially as, and for the purposes set forth.

5. In a photographic shutter, more than one slide, each slide having a plurality of openings, and means to move the said slides at different speeds so as to open and close the shutter, substantially as, and for the purposes set forth.

6. In a photographic shutter, two or more slides each having a plurality of openings and means to move the said slides at different speeds, so as to open and close the shutter, substantially as, and for the purposes set forth.

7. In a photographic shutter, two or more slides each having a plurality of openings, the openings in each slide being of different width from those in the other slide, and means to move the said slides at different speeds, so as to open and close the shutter, substantially as, and for the purposes set forth.

8. In a photographic shutter, two slides each having a plurality of openings, the openings in each slide being of different width from those in the other slide, and means to move the said slides at speeds inversely proportional to the widths of the openings in the said slides, so as to open and close the shutter, substantially as, and for the purposes set forth.

9. In a photographic shutter, two slides each having a plurality of openings, the said openings and the intervening solid parts being so spaced and proportioned that the openings in each slide may all be completely covered by the solid portions of the other slide, and means to move the said slides at different speeds, so as to open and close the shutter, substantially as, and for the purposes set forth.

10. In a photographic shutter, two slides each having a plurality of openings, the said openings and the intervening solid parts being so spaced and proportioned that the openings in each slide may all be completely covered by the solid portions of the other slide, means to hold the slides in a closed position, means to release them and means to move them at different speeds from the said closed position, through an open position to a closed position again, substantially as, and for the purposes set forth.

EDWARD H. R. BARTON.

Witnesses:
OLIVER C. WEATHERBY,
EDW. E. SACKETT.